(12) United States Patent
Gerhart et al.

(10) Patent No.: US 9,927,999 B1
(45) Date of Patent: Mar. 27, 2018

(54) TRIM MANAGEMENT IN SOLID STATE DRIVES

(71) Applicant: Western Digital Technologies, Inc., Irvine, CA (US)

(72) Inventors: Darin Edward Gerhart, Oronoco, MN (US); Timothy Glen Hallett, Oronoco, MN (US); Daniel Robert Lipps, Kasson, MN (US); Nicholas Edward Ortmeier, Rochester, MN (US)

(73) Assignee: Western Digital Technologies, Inc., Irvine, CA (US)

( * ) Notice: Subject to any disclaimer, the term of this patent is extended or adjusted under 35 U.S.C. 154(b) by 35 days.

(21) Appl. No.: 15/261,061

(22) Filed: Sep. 9, 2016

(51) Int. Cl.
*G06F 3/06* (2006.01)
(52) U.S. Cl.
CPC ............ *G06F 3/064* (2013.01); *G06F 3/0604* (2013.01); *G06F 3/0673* (2013.01)
(58) Field of Classification Search
CPC ........ G06F 3/06; G06F 3/0601; G06F 3/0602; G06F 3/0604
See application file for complete search history.

(56) References Cited

U.S. PATENT DOCUMENTS

| 8,996,768 | B2 | 3/2015 | Cohen et al. |
| 9,251,067 | B1 | 2/2016 | Tomlin |
| 2012/0203986 | A1 | 8/2012 | Strasser et al. |
| 2013/0132650 | A1 | 5/2013 | Choi et al. |
| 2013/0326113 | A1 | 12/2013 | Wakrat et al. |

FOREIGN PATENT DOCUMENTS

EP 2838026 A2 2/2015

OTHER PUBLICATIONS

Tedu, "lessons learned about Trim," Retrieved from <http://www.tedunangst.com/flak/post/lessons-learned-about-TRIM> Jul. 21, 2011, 2 pgs.
Samsung Electronics Co. Ltd., "Samsung SSD Magician User Manual," Samsung, 2011, Retrieved from <http://www.xander.com.hk/product/product_manual/prod_manual_500.pdf> on Apr. 20, 2016, 59 pgs.

*Primary Examiner* — David X Yi
*Assistant Examiner* — Zubair Ahmed
(74) *Attorney, Agent, or Firm* — Foley & Lardner LLP (57) ABSTRACT

A storage device may include a data storage portion, including a plurality of blocks of data, and a controller. The controller may be configured to receive a command that includes an inherent trim request for the plurality of blocks of data. The controller may be configured to perform a trim operation on a first set of trim blocks from the plurality of blocks of data, which may include fewer than all blocks of the plurality of blocks of data and may include trim blocks on which the controller can complete the trim operation within a predetermined time. The controller may be configured to update a pending trim table to include an indication of a second set of trim blocks on which trim is to be performed, which may include blocks of data on which the controller cannot complete the trim operation within the predetermined time.

20 Claims, 5 Drawing Sheets

TRIM MANAGEMENT IN SOLID STATE DRIVES

TECHNICAL FIELD

The disclosure relates to data storage management.

BACKGROUND

Solid-state drives (SSDs) may be used in computers in applications where relatively low latency and high capacity storage are desired. Additionally, SSDs may utilize multiple, parallel data channels to read from and write to memory devices, which may result in high sequential read and write speeds. SSDs may utilize NAND flash memory cells that can only be directly written to when erased. If the cells contain data, that data must be erased before a write operation. An SSD can write to a single page, but can only erase an entire block. To overwrite a page, the contents of the data block must be read and stored in a cache, the data block erased, the overwritten page written to the cached block, and the cached block written to the data block.

When a user initiates a delete operation, the operating system may flag the corresponding logical address as no longer being associated with valid data. However, the operating system may not communicate this to the SSD, so the SSD may not be alerted that data blocks associated with the logical address no longer store valid data.

The operating system may utilize a trim or unmap command to notify the SSD which logical addresses no longer are associated with valid data. This may enable the SSD to erase blocks of data associated with the logical addresses, with the timing being controlled by the controller of the SSD. This may reduce the number of writes on the SSD, increase write speed, and increase drive life.

SUMMARY

In one example, the disclosure is directed to a method that may include receiving, by a controller of a storage device, a command including an inherent trim request for a plurality of blocks of data. The method may further include performing, by the controller, a trim operation on a first set of trim blocks associated with the plurality of blocks of data. The first set of trim blocks may be associated with fewer than all blocks of the plurality of blocks of data and may include trim blocks on which the controller can complete the trim operation within a predetermined time. The method may further include updating, by the controller, a pending trim table to include an indication of a second set of trim blocks on which trim is to be performed. Blocks from the plurality of blocks of data may be associated with the first set of trim blocks or the second set of trim blocks, but not both. The second set of trim blocks may include blocks of data on which the controller cannot complete the trim operation within the predetermined time.

In another example, the disclosure is directed to a storage device that may include a data storage portion and a controller. The data storage portion may comprise a set of blocks designated to store a plurality of blocks of data. The controller may be configured to receive a command that includes an inherent trim request for the plurality of blocks of data. The controller may further be configured to perform a trim operation on a first set of trim blocks from the plurality of blocks of data. The first set of trim blocks may include fewer than all blocks of the plurality of blocks of data and may include trim blocks on which the controller can complete the trim operation within a predetermined time. The controller may further be configured to update a pending trim table to include an indication of a second set of trim blocks on which trim is to be performed. Blocks from the plurality of blocks of data may be part of the first set of blocks or the second set of blocks, but not both. The second set of trim blocks may include blocks of data on which the controller cannot complete the trim operation within the predetermined time.

In another example, the disclosure is directed to a computer-readable storage medium storing instructions that, when executed, may cause a processor to receive a command that includes an inherent trim request for a plurality of blocks of data. The instructions may also cause the processor to perform a trim operation on a first set of trim blocks from the plurality of blocks of data. The first set of trim blocks may include fewer than all blocks of the plurality of blocks of data, and may include trim blocks on which the controller can complete the trim operation within a predetermined time. The instructions may also cause the processor to update a pending trim table to include an indication of a second set of trim blocks on which trim is to be performed. Blocks from the plurality of blocks of data may be part of the first set of trim blocks or the second set of trim blocks, but not both. The second set of trim blocks may include blocks of data on which the controller cannot complete the trim operation within the predetermined time.

The details of one or more examples of the disclosure are set forth in the accompanying drawings and the description below. Other features, objects, and advantages of the disclosure will be apparent from the description and drawings, and from the claims.

DETAILED DESCRIPTION

The disclosure describes techniques for managing trim operations for a storage device, such as a solid state drive (SSD), using foreground and background trim operations, which may increase efficiency and reduce wear to memory cells in the storage device. A storage device may include a data storage portion and a controller. The data storage portion may include at least a set of blocks that store a plurality of blocks of data. A processor, such as a processor in the controller of the storage device, may receive a command from a host device that includes an inherent trim request for at least two blocks of data. The processor may perform a trim operation on a first set of the at least two blocks of data that the processor can complete within a predetermined time. In some examples, the predetermined time may be selected to be less than a system timeout. The processor may defer execution or completion of a trim operation on a remaining second set of the at least two blocks of data after successful completion status has been returned to host for the originating command that included an inherent trim request. The processor may update a pending trim table to include an indication of the second set of the blocks of data on which a trim is to be performed. The processor may perform a second trim operation on the deferred second set of the blocks of data as a background operation when the processor is not actively performing any commands received from the host device.

In general, host systems may not tolerate device timeouts that exceed host timeout limits. Host timeouts limits for commands that require inherent trims typically do not vary with capacity. For example, a host may allocate the same host timeout limit for an unmap command requiring a single trim operation as a format command requiring a large number of trim operations. Customer configurations and command options may greatly impact the time required to complete trim operations. However, the command parameters, such as the extent of trim and number of discrete trims, may be controlled by the host. A command requiring a large sequential trim operation may exceed the host timeout limit. Rather than allow trim operations to exceed the host timeout, the techniques of this disclosure may provide for selectively deferring a portion of the trim operations from foreground to background. The techniques of this disclosure may further increase the efficiency of trim operations and reduce the number of system timeouts caused by excessive trim operations.

Figure 1:
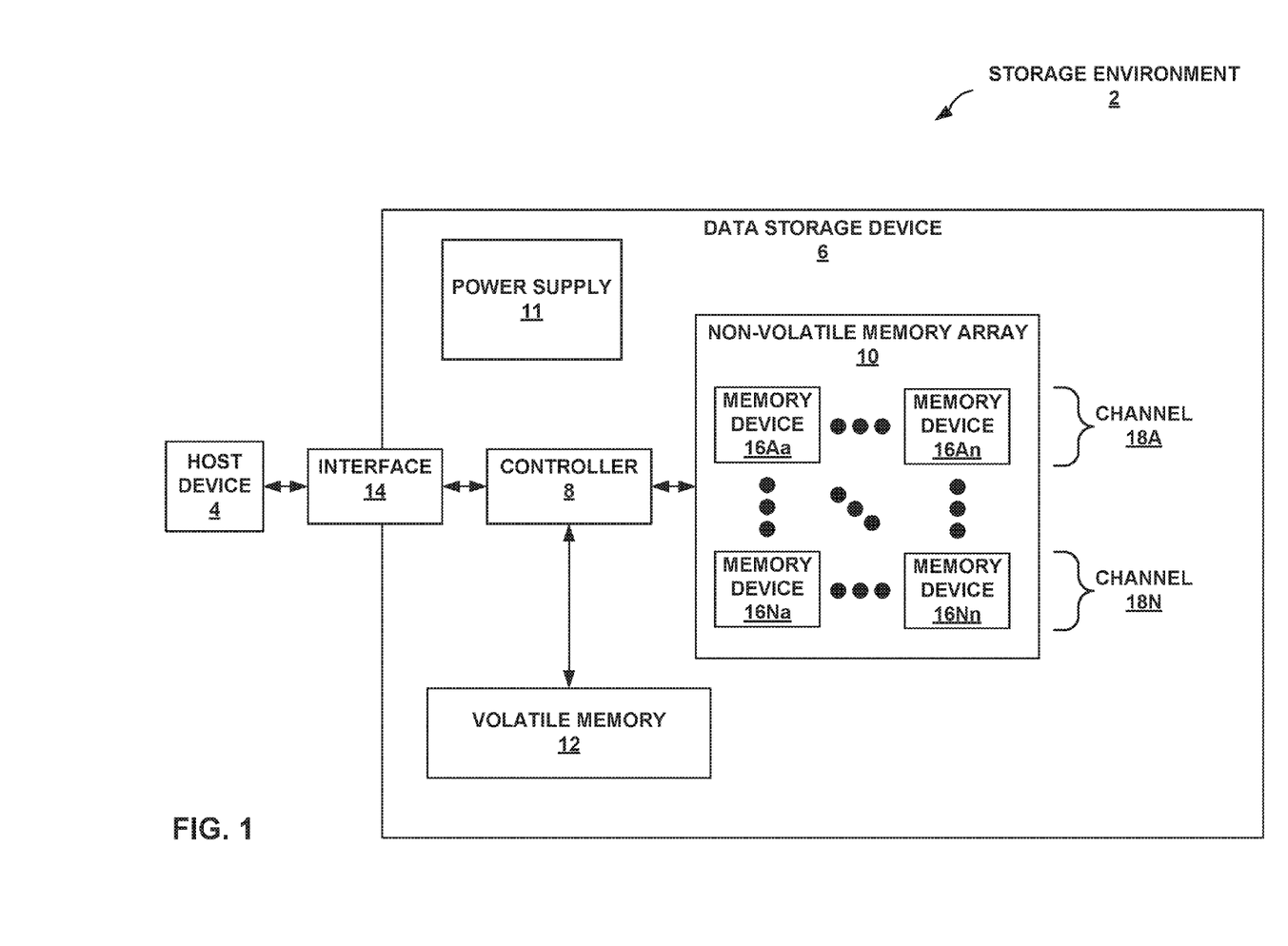
FIG. 1 is a conceptual and schematic block diagram illustrating an example storage environment including a storage device connected to a host device, where the storage device is configured to manage trim operations in accordance with one or more techniques of this disclosure.

FIG. 1 is a conceptual and schematic block diagram illustrating an example storage environment 2 including data storage device 6 that may function as a storage device for host device 4, where data storage device 6 is configured to manage trim operations in accordance with one or more techniques of this disclosure. For instance, host device 4 may utilize non-volatile memory devices included in data storage device 6 to store and retrieve data. In some examples, storage environment 2 may include a plurality of storage devices, such as data storage device 6, which may operate as a storage array. For instance, storage environment 2 may include a plurality of storages devices 6 configured as a redundant array of inexpensive/independent disks (RAID) that collectively function as a mass storage device for host device 4.

Storage environment 2 may include host device 4 which may store data to and/or retrieve data from one or more storage devices, such as data storage device 6. As illustrated in FIG. 1, host device 4 may communicate with data storage device 6 via interface 14. Host device 4 may include any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

As illustrated in FIG. 1, data storage device 6 may include controller 8, non-volatile memory array 10 (NVMA 10), power supply 11, volatile memory 12, and interface 14. In some examples, data storage device 6 may include additional components not shown in FIG. 1 for sake of clarity. For example, data storage device 6 may include a printed circuit board (PCB) to which components of data storage device 6 are mechanically attached and which includes electrically conductive traces that electrically interconnect components of data storage device 6, or the like. In some examples, the physical dimensions and connector configurations of data storage device 6 may conform to one or more standard form factors. Some example standard form factors include, but are not limited to, 3.5" hard disk drive (HDD) or SSD, 2.5" HDD or SSD, 1.8" HDD or SSD, peripheral component interconnect (PCI), PCI-extended (PCI-X), PCI Express (PCIe) (e.g., PCIe x1, x4, x8, x16, PCIe Mini Card, MiniPCI, etc.), M.2, or the like. In some examples, data storage device 6 may be directly coupled (e.g., directly soldered) to a motherboard of host device 4.

Data storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA), and parallel-ATA (PATA)), Fibre Channel Arbitrated Loop (FCAL), small computer system interface (SCSI), serially attached SCSI (SAS), peripheral component interconnect (PCI), PCI-express, Non-Volatile Memory Express (NVMe), or the like. The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit data storage device 6 to receive power from host device 4.

Data storage device 6 includes NVMA 10, which includes a plurality of memory devices 16Aa-16Nn (collectively, "memory devices 16"). Each of memory devices 16 may be configured to store and/or retrieve data. For instance, a memory device of memory devices 16 may receive data and a message from controller 8 that instructs the memory device to store the data. Similarly, the memory device of memory devices 16 may receive a message from controller 8 that instructs the memory device to retrieve data. In some examples, each of memory devices 16 may be referred to as a die. In some examples, a single physical chip may include a plurality of dies (i.e., a plurality of memory devices 16). In some examples, each of memory devices 16 may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, memory devices 16 may include any type of non-volatile memory devices. Some examples of memory devices 16 include, but are not limited to flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices. In some examples, memory devices 16 may include magnetic data store devices.

In some examples, memory devices 16 may include flash memory devices. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each page of the plurality of pages within a particular memory device may include a plurality of NAND cells. Rows of NAND cells may be electrically connected using a word line to define a page of a plurality of pages. Respective cells in each of the plurality of pages may be electrically connected to respective bit lines. In some examples, controller 8 may write data to and read data from NAND flash memory devices at the page level and erase data from NAND flash memory devices at the block level. Additional details of memory devices 16 are discussed below with reference to FIG. 2.

Figure 2:
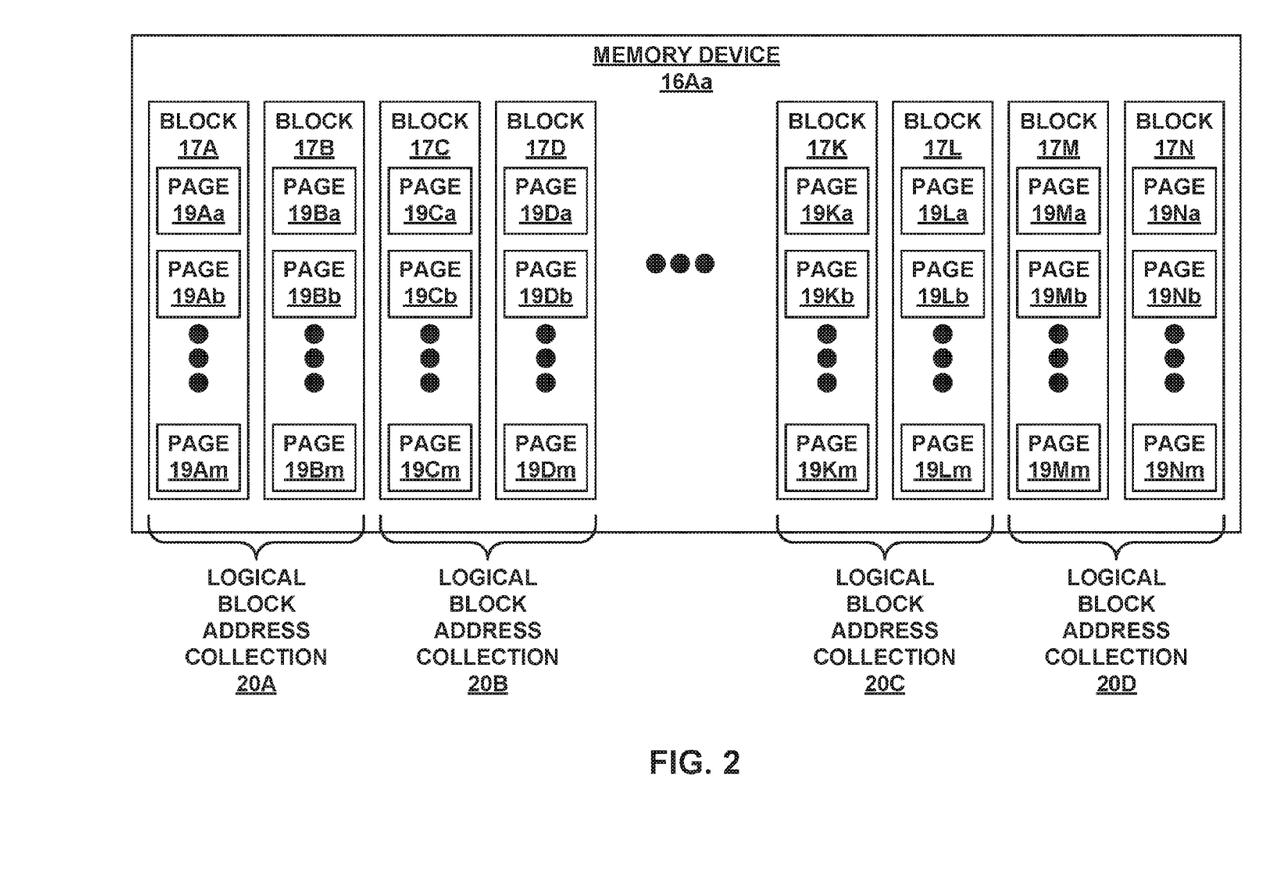
FIG. 2 is a conceptual block diagram illustrating an example memory device that stores blocks of data, in accordance with one or more techniques of this disclosure.

FIG. 2 is a conceptual block diagram illustrating an example memory device 16Aa that includes a plurality of blocks 17A-17N (collectively, "blocks 17"), each block including a plurality of pages 19 Aa-19Nm (collectively, "pages 19"). Each block of blocks 17 may include a plurality of NAND cells. Rows of NAND cells may be serially electrically connected using a word line to define a page (one page of pages 19). Respective cells in each of a plurality of pages 19 may be electrically connected to respective bit lines. Controller 8 may write data to and read data from NAND flash memory devices at the page level and erase data from NAND flash memory devices at the block level. A group of two or more blocks may be referred to a logical block address collection. For example, logical block address collection 20A may include blocks 17A-17B, logical block address collection 20B may include blocks 17C-17D, logical block address collection 20C may include blocks 17K-17L, and logical block address collection 20D may include blocks 17M-17N.

In some examples, controller 8 may designate one or more of blocks 17 as trim blocks. For example, a single trim block may include a single one of blocks 17, or a single trim block may include a plurality of blocks 17. A trim block may represent the smallest amount of data that may be trimmed in a single trim operation. In some examples, the size of a trim block may be predetermined, e.g., set as part of the firmware executed by controller 8. In other examples, the size of a trim block may be set by a user-defined tuning parameter. In some examples, information that associates a trim block with one or more blocks 17 may be stored by data storage device 6, such as in a table stored in volatile memory 12 or NVMA 10 that associates one or more trim blocks to logical addresses of blocks 17.

Returning to FIG. 1, in some examples, it may not be practical for controller 8 to be separately connected to each memory device of memory devices 16. As such, the connections between memory devices 16 and controller 8 may be multiplexed. As an example, memory devices 16 may be grouped into channels 18A-18N (collectively, "channels 18"). For instance, as illustrated in FIG. 1, memory devices 16Aa-16An may be grouped into first channel 18A, and memory devices 16Na-16Nn may be grouped into $N^{th}$ channel 18N. The memory devices 16 grouped into each of channels 18 may share one or more connections to controller 8. For instance, the memory devices 16 grouped into first channel 18A may be attached to a common I/O bus and a common control bus. Data storage device 6 may include a common I/O bus and a common control bus for each respective channel of channels 18. In some examples, each channel of channels 18 may include a set of chip enable (CE) lines which may be used to multiplex memory devices on each channel. For example, each CE line may be connected to a respective memory device of memory devices 18. In this way, the number of separate connections between controller 8 and memory devices 18 may be reduced. Additionally, as each channel has an independent set of connections to controller 8, the reduction in connections may not significantly affect the data throughput rate as controller 8 may simultaneously issue different commands to each channel.

Data storage device 6 may include power supply 11, which may provide power to one or more components of data storage device 6. When operating in a standard mode, power supply 11 may provide power to the one or more components using power provided by an external device, such as host device 4. For instance, power supply 11 may provide power to the one or more components using power received from host device 4 via interface 14. In some examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like.

Data storage device 6 also may include volatile memory 12, which may be used by controller 8 to store information. In some examples, controller 8 may use volatile memory 12 as a cache. For instance, controller 8 may store cached information in volatile memory 12 until the cached information is written to memory devices 16. Volatile memory 12 may consume power received from power supply 11. Examples of volatile memory 12 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)).

Data storage device 6 includes controller 8, which may manage one or more operations of data storage device 6. For example, controller 8 may manage the reading of data from and/or the writing of data to memory devices 16. Controller 8 may interface with host device 4 via interface 14 and manage the storage of data to and the retrieval of data from volatile memory 12 and memory devices 16. Controller 8 may, as one example, manage writes to and reads from memory devices 16 and volatile memory 12. In some examples, controller 8 may be a hardware controller. In other examples, controller 8 may be implemented into data storage device 6 as a software controller.

Controller 8 may receive one or more commands from host device 4 that require inherent trim operations. Examples of commands that require inherent trim operations include commands that delete data such as TCG (Trusted Computing Group) revert, TCG key erase, unmap, write same, format, and the like. In some examples, controller 8 may complete the inherent trim operation in different amounts of time depending on the number of blocks of data to be trimmed. For example, controller 8 may utilize more time to complete an inherent trim operation that includes more blocks compared to an inherent trim operation that includes fewer blocks. Host timeouts for these commands usually do not vary with capacity. Thus, for some inherent trim operations, the time required to complete the trim operations may exceed the host timeout. Further, debugging the timeout may be difficult, as there may not be adequate system logging during the trim operations. As such, the principles presented herein describe a trim operation handling process for controller 8 to efficiently handle trim operations and reduce the probability or frequency of system timeouts.

In accordance with the principles of the disclosure, in some examples, controller 8 may receive a command that includes an inherent trim request for a plurality of blocks of data from the host device 4 via interface 14. As described above, each memory device 16 in NVMA 10, such as memory device 16Aa (FIG. 2), includes a plurality of blocks 17, or a set of blocks 17. For example, host device 4 may issue an unmap command through interface 14 to controller 8 for a plurality of blocks 17A-D and 17K-N on memory device 16Aa. Controller 8 may determine one or more trim blocks associated with the plurality of blocks of data. As described above, a trim block may define the smallest logical unit that can be trimmed in a single operation. In some examples, controller 8 may maintain information that associates the plurality of blocks of data with the one or more trim blocks. For example, controller 8 may look up logical addresses of the plurality of blocks of data and determine which trim block(s) are associated with the respective blocks of the plurality of blocks, such as through a table.

For instance, continuing with the above example, controller 8 may designate logical block address collection 20A as a first trim block, logical block address collection 20B as a second trim block, logical block address collection 20C as a third trim block, and logical block address collection 20D as a fourth trim block. In response to the unmap command, controller 8 may determine, such as by looking up in a table, that blocks 17A and 17B are associated with logical block address collection 20A (the first trim block), blocks 17C and 17D are associated with logical block address collection 20B (the second trim block), blocks 17K and 17L are associated with logical block address collection 20C (the third trim block), and blocks 17M and 17N are associated with logical block address collection 20D (the fourth trim block). As an example, controller 8 may further determine that all blocks 17A-D and 17K-N in each of logical block address collections 20A-D are indicated for deletion, and thus that logical block address collections 20A-D can be trimmed.

Controller 8 may further perform a trim operation on a first set of trim blocks (e.g., one or more trim blocks) from the plurality of blocks of data. The first set of trim blocks may be associated with fewer than all blocks of the plurality of blocks of data, and may be associated with fewer than all of the blocks of data to be trimmed based on the inherent trim request. The first set of trim blocks may include trim blocks on which controller 8 can complete the trim operation within a predetermined time (i.e., "foreground trim"). In some examples, the predetermined time may be a time that is less than a system timeout time. For example, the predetermined time may be some percentage of a system timeout time, such as 90% or 80% of a system timeout time.

For instance, continuing with the example above, the unmap command sent from host device 4 may require that controller 8 trim logical block collections 20A-D associated with blocks 17A-D and 17K-N from memory device 16Aa. Controller 8 may perform a trim operation on logical block address collections 20A and 20B, constituting the first set of trim blocks, in a predetermined time such as, for example, 90% of a system timeout time. Controller 8 may not perform a trim operation on the remaining logical block address collections 20C and 20D in the predetermined time.

Controller 8 may further update a pending trim table to include an indication of a second set of trim blocks on which trim is to be performed. The pending trim table may include a table entry for each trim block that includes an indication whether the respective trim block requires a trim operation. In some examples, a trim block may include a plurality of logically sequential blocks. In some examples, the indication whether the trim block requires a trim may be a single bit indication that the trim block either requires a trim or does not require a trim.

The second set of trim blocks are associated with blocks of data on which controller 8 cannot complete the trim operation within the predetermined time. For instance, continuing with the example above, controller 8 may update a table entry for each logical block address collection 20C and 20D, constituting the second set of trim blocks, to indicate that the respective trim block associated with the table entry requires a trim operation. In some examples, the blocks from the plurality of blocks of data are associated with the first set of trim blocks or the second set of trim blocks, but not both.

Controller 8 may further perform, as background operations, additional trim operations on one or more trim blocks for which the pending trim table indicates that a trim is to be performed (i.e., "background trim"). A background operation may be any operation initiated by controller 8 that was not directly initiated by host device 4, e.g., approximately preceding the operation. In some examples, controller 8 may perform background operations using resources that are not otherwise occupied by commands directly initiated by host device 4. For instance, continuing the example above, controller 8 may perform a trim operation on logical block address collections 20C and 20D several seconds after the unmap command was received and indicated as completed by controller 8, or upon completing other pending commands received from host device 4. In some examples, controller 8 may perform a trim operation on logical block address collection 20C at a first time, and perform a trim operation on logical block address collection 20D at a second time.

Commands with large inherent trim operations may cause storage environment 2 to timeout. By selectively deferring a portion of the trim operations from foreground to background, controller 8 may reduce such timeouts. Instead, a set of the trim blocks that may cause controller 8 to exceed the host timeout may instead be deferred and trimmed by controller 8 in the background. The techniques of this disclosure may further increase the efficiency of trim operations and reduce the number of system timeouts caused by excessive trim operations.

Figure 3:
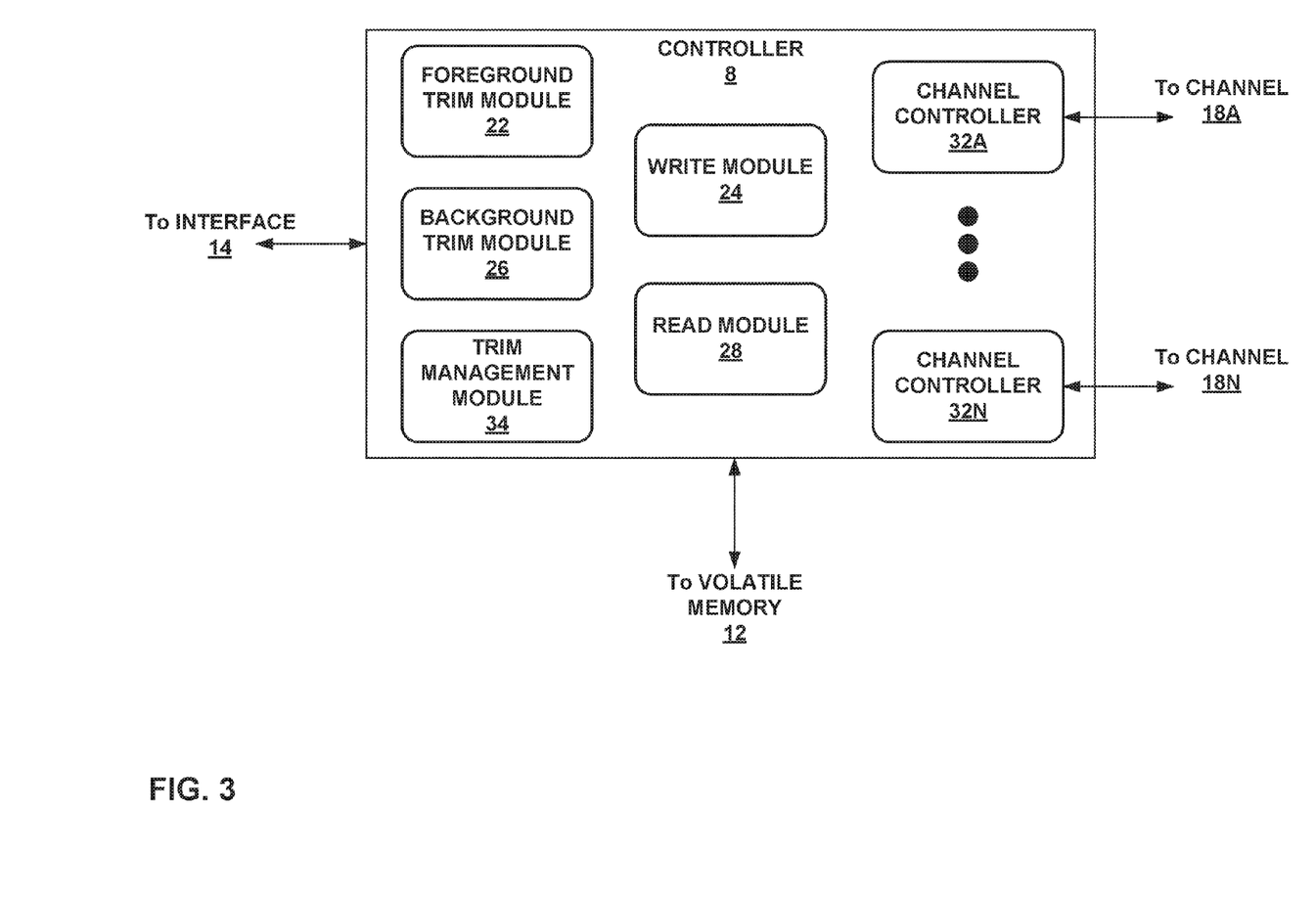
FIG. 3 is a conceptual and schematic block diagram illustrating an example controller configured to manage trim operations in accordance with one or more techniques of this disclosure.

FIG. 3 is a conceptual and schematic block diagram illustrating an example controller 8 configured to manage trim operations in accordance with one or more techniques of this disclosure. In some examples, controller 8 may include foreground trim module 22, write module 24, background trim module 26, read module 28, a plurality of channel controllers 32A-32N (collectively, "channel controllers 32"), and trim management module 34. In other examples, controller 8 may include additional modules or hardware units, or may include fewer modules or hardware units. Controller 8 may include one or more microprocessors, digital signal processors (DSP), application specific integrated circuits (ASIC), field programmable gate arrays (FPGA), or other digital logic circuitry.

Controller 8 may interface with the host device 4 via interface 14 and manage the storage of data to and the retrieval of data from memory devices 16. For example, write module 24 of controller 8 may manage writes to memory devices 16. Write module 24 may manage writing of the user data to memory devices 16.

For example, write module 24 may manage translation between logical addresses used by host device 4 to manage storage locations of data and physical block addresses used by write module 24 to direct writing of data to memory devices. Write module 24 of controller 8 may utilize a flash translation layer or indirection table that translates logical addresses (or logical block addresses) of data stored by memory devices 16 to physical block addresses of data stored by memory devices 16. For example, host device 4 may utilize the logical block addresses of the data stored by memory devices 16 in instructions or messages to data storage device 6, while write module 24 utilizes physical block addresses of the data to control writing of data to memory devices 16. (Similarly, read module 28 may utilize physical block addresses to control reading of data from memory devices 16.) The physical block addresses correspond to actual, physical blocks of memory devices 16. In some examples, write module 24 may store the flash translation layer or table in volatile memory 12. Upon receiving the data for one or more logical block addresses, write module 24 may define and/or select one or more physical blocks, and communicate a message to channel controllers 32A-32N (collectively, "channel controllers 32"), which causes the channel controllers 32 to write the data to the physical blocks.

Each channel controller of channel controllers 32 may be connected to a respective channel of channels 18. In some examples, controller 8 may include the same number of channel controllers 32 as the number of channels 18 of data storage device 6. Channel controllers 32 may perform the intimate control of addressing, programming, erasing, and reading of memory devices 16 connected to respective channels, e.g., under control of write module 24 and/or read module 28.

In some examples, trim management module 34 may be configured to manage trim operations for controller 8. Trim management module 34 may receive instructions from host device 4, which, in some examples, may be issued by host device 4 in response to host device 4 receiving instructions from a user. For example, trim management module may receive instructions representative of user commands from host device 4 through interface 14. In some examples, the instructions may set one or more of a variety of trim parameters that may affect system performance (e.g., performance of trim operations by trim management module 34, foreground trim module 22, and background trim module 26, and, in some examples, performance of write module 24 and read module 28).

In some examples, trim management module 34 may receive an instruction setting the predetermined time that foreground trim module 22 may utilize to perform a trim operation on a first set of trim blocks.

The predetermined time may be selected based on performance considerations, including a system timeout time and a priority given to trim commands. For example, the predetermined time may be selected to be less than a system timeout time. The system timeout time may be a time at which, if controller 8 is not responsive to commands received from host device 4, host device 4 detects an error and initiates a command timeout recovery procedure. By selecting the predetermined time to be less than a system timeout time, inherent trim operations may not cause controller 8 to time out.

The predetermined time also affects the number of trim commands that can be processed by foreground trim module 22. For example, a relatively longer predetermined time may allow foreground trim module 22 to complete more trim commands in the foreground, in connection with the command that includes the inherent trim request. This may reduce a number of trim commands that are performed by background trim module 26. However, this also may reduce command throughput of controller 8 for commands received from host device 4, as controller 8 uses more time to perform trim commands in the foreground. Hence, the predetermined time may be selected based on a consideration of these performance criteria. In some examples, the predetermined time may be some percentage of a system timeout time, such as 90% or 80% of a system timeout time. In other examples, the predetermined time may be overridden, such as with a default value of "0", so that all trim blocks in a trim request may be completed in the foreground, for example. The predetermined time may be statically or dynamically controlled based on behavior of data storage device 6.

In some examples, trim management module 34 may receive an instruction setting the size of trim blocks. Trim management module 34 may configure a pending trim table based on the size of trim blocks, including outstanding trim blocks requiring a trim operation, and map any system resource constraint boundaries to the size of trim blocks. The size of trim blocks may be selected based on performance considerations, including use of system resources. For example, a set of logical blocks may be more efficiently tracked and trimmed when grouped into as few trim blocks as possible (e.g., the size of an individual trim block is as large as possible). However, a trim block having a greater number of logical blocks may require more time and resources to trim, as the trim block is the smallest unit on which a trim command can be performed. Hence, trim blocks that are too large may result in system timeouts, as completing trim on a single trim block may require longer than a system timeout time. Hence, the size of trim blocks may be selected based on a consideration of these performance criteria.

In some examples, a trim block size instruction may directly set the quantity of logical blocks in a trim block. For example, a trim block size instruction may instruct trim management module 34 to include four logical blocks of data in each trim block. In some examples, a latency impact instruction may indirectly set the quantity of logical blocks in a trim block by setting a latency impact of background trim on system resources. As the quantity of blocks in a trim block increases, the latency impact on system resources may increase. For example, the latency impact instruction may instruct trim management module 34 to set the size of trim blocks so that the latency impact of background operations do not exceed system resource constraint boundaries, such as memory bandwidth, processor usage, and the like. Latency impact may be selected within a range of severity of latency impact. For example, if a single byte is used to represent latency impact, minimal latency impact may be indicated by a "0", while maximum latency impact may be indicated by a "0xFF". In some examples, trim management module 34 may dynamically configure trim blocks in the pending trim table. For example, a trim block may include four blocks of data during a foreground trim operation, while a trim block may include eight blocks of data during a background trim operation.

In some examples, trim management module 34 may receive an instruction setting a frequency of background trim operations. For example, the background trim frequency instruction may indicate a predetermined amount of delay time between the end of a first background trim operation and the start of a second background trim operation. Trim management module 34 may cause background trim module 26 to perform a background trim operation at a frequency of the predetermined time until all trim blocks in the pending trim table have been trimmed. The frequency of background trim operations may be selected based on performance considerations, such as system resource impact and impact of other background work. For example, a background trim operation may require a certain amount of system resources. By selecting a greater frequency of background trim operations, the amount of time for which there are pending trim operations may be reduced, but a time dedicated by background trim operations may be increased while there are pending trim operations in the pending trim table. On the other hand, by selecting a smaller frequency of background trim operations, system operation may be impacted less during the time in which there are pending trim operations, but completing all pending background trims may take longer. Hence, the frequency of background trim operations may be selected based on a consideration of these performance criteria. Frequency of background trim may be selected within a range of frequency of background trim. For example, if a single byte is used to represent the background trim frequency, a high frequency of background trim may be indicated by a "0", while a low frequency of background trim may be indicated by a "0xFF".

In accordance with the principles of the disclosure, in some examples, trim management module 34 may receive a command that includes an inherent trim request for a plurality of blocks of data from the host device 4 via interface 14. As described above, each memory device 16 in NVMA 10, such as memory device 16Aa (FIG. 2), includes a plurality of blocks 17, or a set of blocks 17. For example, host device 4 may issue an unmap command for a plurality of blocks 17A-D and 17K-N on memory device 16Aa through interface 14 and trim management module 34 may receive this unmap command.

Trim management module 34 may determine one or more trim blocks associated with the plurality of blocks of data. In some examples, trim management module 34 may maintain information that associates a respective trim block with a plurality of blocks of data. For example, trim management module 34 may look up logical addresses of the plurality of blocks of data and determine which trim block(s) are associated with the plurality of blocks, such as through a table or other data structure.

For instance, continuing with the above example, trim management module 34 may designate logical block address collection 20A as a first trim block, logical block address collection 20B as a second trim block, logical block address collection 20C as a third trim block, and logical block address collection 20D as a fourth trim block. In response to the unmap command, trim management module 34 may determine, such as by looking up in a table, that blocks 17A and 17B are associated with logical block address collection 20A, blocks 17C and 17D are associated with logical block address collection 20B, blocks 17K and 17L are associated with logical block address collection 20C, and blocks 17M and 17N are associated with logical block address collection 20D. Trim management module 34 may determine that all blocks 17A-D and 17K-N in each of logical block address collections 20A-D are indicated for deletion, and thus that logical block address collections 20A-D can be trimmed.

Foreground trim module 22 may perform a trim operation on a first set of trim blocks from the plurality of trim blocks. The first set of trim blocks may be associated with fewer than all blocks of the plurality of blocks of data, and may be associated with fewer than all of the blocks of data to be trimmed based on the inherent trim request. The first set of trim blocks may include trim blocks on which foreground trim module 22 can complete the trim operation within a predetermined time.

For instance, continuing with the example above, the unmap command sent from host device 4 may require that foreground trim module 22 trim logical block collections 20A-D associated with blocks 17A-D and 17K-N from memory device 16Aa.

Foreground trim module 22 may perform a trim operation on logical block address collections 20A and 20B, constituting the first set of trim blocks, in the predetermined time. Foreground trim module 22 may not perform a trim operation on the remaining logical block address collections 20C and 20D in the predetermined time.

In some examples, foreground trim module 22 may select the first set of trim blocks according to various performance criteria, such as more evenly distributing storage device utilization, decreasing resource utilization, decreasing background trim operation time, and reducing trim operation conflicts during background trim operations. In some examples, foreground trim module 22 may select the first set of trim blocks based on a sequential range. For example, foreground trim module 22 may perform a trim on two trim blocks that include blocks having sequential logical block addresses, as blocks having sequential logical block addresses may, for example, be more likely to share circuitry and use fewer resources. In some examples, foreground trim module 22 may select the first set of trim blocks based on a spatial algorithm. For example, foreground trim module 22 may select two trim blocks located on a first memory device for a first trim operation and two trim blocks located on a different memory device for a second trim operation, so that the first trim operation and the second trim operation may be performed in parallel. In some examples, foreground trim module 22 may select the first set of trim blocks based on a timing algorithm. For example, foreground trim module 22 may select the pending trim blocks based on least recently used logic, so that the trim block that was least recently used will be trimmed first. A logical block that is least recently used may be more likely to be accessed, and thus create a conflict (if read module 28 or write module 24 attempts to access the logical block when the logical block is being trimmed), so using least recently used logic to prioritize trim blocks may reduce conflict during background trim operations.

Trim management module 34 may further update a pending trim table to include an indication of a second set of trim blocks on which trim is to be performed. The pending trim table may include a table entry for each trim block that includes an indication whether the respective trim block requires a trim. In some examples, a trim block may include a plurality of logically sequential blocks. In some examples, the indication whether the trim block requires a trim may be a single bit indicating either that the trim block requires a trim or does not require a trim. The second set of trim blocks are associated with blocks of data on which foreground trim module 22 cannot complete the trim operation within the predetermined time.

For instance, continuing with the example above, trim management module 34 may update a table entry for each logical block address collection 20C and 20D, constituting the second set of trim blocks, to indicate that the trim block associated with the table entry requires a trim operation. In some examples, the blocks from the plurality of blocks of data are associated with the first set of trim blocks or the second set of trim blocks, but not both.

Background trim module 26 may perform, as background operations, additional trim operations on one or more trim blocks for which the pending trim table indicates that a trim is to be performed. A background operation may be any operation initiated by controller 8 that was initiated after good completion status was sent for a command from host device 4. In some examples, background trim module 26 may include a locking mechanism so that, for example, background operations are atomic with potential concurrent overlapped host commands.

Trim management module 34 may update the pending trim table to indicate that trim blocks on which a trim operation had been performed no longer require a trim. The pending trim table may be updated, for example, to NVMA 10. For instance, continuing the example above, trim management module may update the trim table to reflect that logical block address collection 20C and 20D no longer require a trim operation, such as by flipping a bit associated with each logical block address collection 20C and 20D.

In some examples, trim management module 34 may utilize the pending trim table to track pending trims across system shutdown periods. In some examples, trim management module 34 may schedule trim operations during system startups. In some examples, trim management module 34 may load the pending trim table at boot and resume background trim operations for trim blocks indicated in the pending trim table as requiring a trim. In some examples, trim management module 34 may cause foreground trim module 22 to perform trim operations on trim blocks indicated in the pending trim table as requiring a trim while host device 4 waits for data storage device 6 to become ready to execute media access commands following the power cycle. In some examples, data storage device 6 may delay notifying host device 4 that data storage device 6 is ready to execute media access commands until after foreground trim module 24 completes any trim operations on trim blocks indicated in the pending trim table to require a trim operation.

In some examples, controller 8 may be configured to manage trim for blocks involved with a pending command, such as a media access command by a customer. Trim management module 34 may receive a command involving one or more blocks of data. Trim management module 34 may further determine one or more trim blocks associated with the plurality of blocks of data. Trim management module 34 may look up logical addresses of the one or more trim blocks in a pending trim table and determine whether any of the one or more trim blocks are indicated as requiring a trim in the pending trim table. In response to no trim blocks from the command indicated as requiring a trim in the pending trim table, controller 8 may execute the command. In response to trim blocks from the command indicated as requiring a trim in the pending trim table, foreground trim module 22 may perform one or more trim operations on the trim blocks. Trim management module 34 may update the pending trim table to indicate that trim blocks on which a trim operation has been performed do not require a trim. In response to trimming all trim block associated with the command, controller 8 may execute the command.

For instance, continuing the example above, a media access command may have been received by trim management module 34 before background trim module 26 performed a trim operation on logical block address collections 20C and 20D. The command may be, for example, a write command for data to block 17K. Trim management module 34 may determine that block 17K is associated with logical block address collection 20C. Trim management module 34 may look up logical block address collection 20C in the pending trim table and determine that logical block address collection 20C has a required trim. Foreground trim module 22 may perform a trim on logical block address collection 20C. Controller 8 may then perform a write on block 17K.

In some examples, trim management module 34 may store the pending trim table, such as in NVMA 10, before command status is returned from data storage device 6 to host device 4. If command status is not returned from data storage device 6 to host device 4, command results may be indicated as indeterminate, and host device 4 may reissue an interrupted command.

Figure 4:
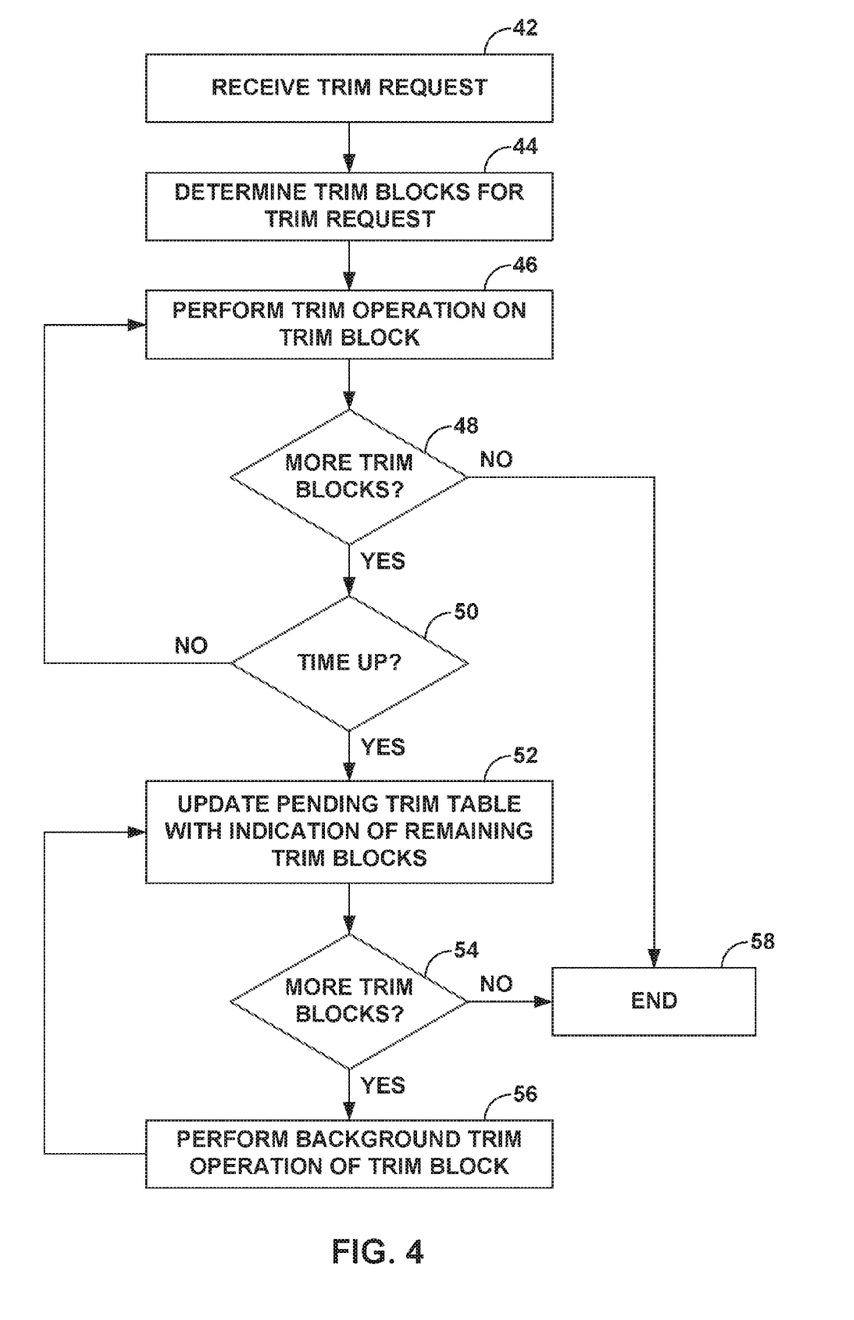
FIG. 4 is a flow diagram illustrating an example technique for trim management performed by a controller of a storage device, in accordance with one or more techniques of this disclosure.

FIG. 4 is a flow diagram illustrating example trim management operations performed by a controller of a storage device, in accordance with one or more techniques of this disclosure. For ease of illustration, the exemplary technique of FIG. 4 will be described with concurrent reference to data storage device 6 and controller 8 of FIGS. 1 and 3. However, the techniques may be used with any combination of hardware or software.

In accordance with the principles of the disclosure, in some examples, controller 8 may receive a command that includes an inherent trim request for a plurality of blocks of data from the host device 4 via interface 14 (42). Controller 8 may further determine one or more trim blocks associated with the plurality of blocks of data (44). In some examples, controller 8 may maintain information that associates the plurality of blocks of data with the one or more trim blocks. For example, controller 8 may look up logical addresses of the plurality of blocks of data and determine which trim blocks are associated with the plurality of blocks, such as through a table.

Controller 8 may further perform a trim operation on a first set of trim blocks from the plurality of blocks of data (46). The first set of trim blocks may be associated with fewer than all blocks of the plurality of blocks of data, and may be associated with fewer than all of the blocks of data to be trimmed based on the inherent trim request. The first set of trim blocks may include trim blocks on which controller 8 can complete the trim operation within a predetermined time (50). Controller 8 may continue to perform trim operations on the trim blocks ("yes" branch of 48 and "no" branch of 50) until there are no more trim blocks ("no" branch of 48) or the predetermined time has been exceeded ("yes" branch of 50). If there are no more trim blocks to trim, the method may end (58). In some examples, the predetermined time may be a time that is less than a system timeout time.

Controller 8 may further update a pending trim table to include an indication of a second set of trim blocks on which trim is to be performed (52). The pending trim table may include a table entry for each trim block that includes an indication as to whether the trim block requires a trim. In some examples, a trim block may include a plurality of logically sequential blocks. In some examples, the indication whether the trim block requires a trim may be a single bit indicating that the table entry either requires a pending trim or not. The second set of trim blocks are associated with blocks of data on which controller 8 cannot complete the trim operation within the predetermined time ("yes" branch of 50).

In response to one or more trim blocks in the pending trim table ("yes" branch of 54), controller 8 may further perform, as background operations, additional trim operations on one or more trim blocks for which the pending trim table indicates that a trim is to be performed (56). A background operation may be any operation initiated by controller 8 that was initiated after good completion status was sent for a command from host device 4. If there are no more trim blocks to trim ("no" branch of 54), the method may end (58).

Figure 5:
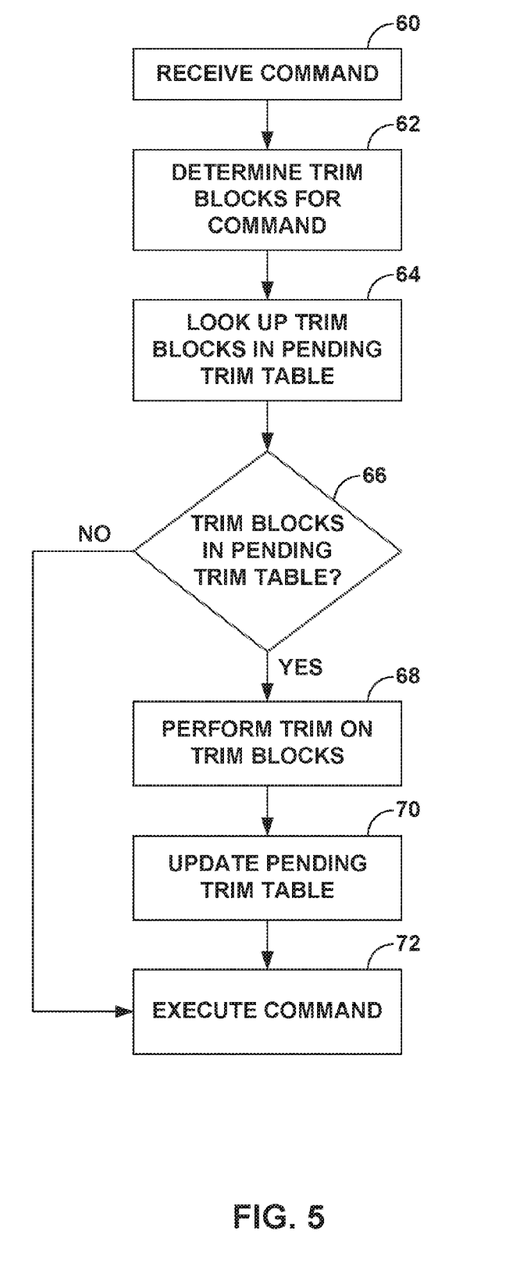
FIG. 5 is a flow diagram illustrating example command management during trim management operations performed by a controller of a storage device, in accordance with one or more techniques of this disclosure.

FIG. 5 is a flow diagram illustrating example command management during trim management operations performed by a controller of a storage device, in accordance with one or more techniques of this disclosure. For ease of illustration, the exemplary technique of FIG. 5 will be described with concurrent reference to data storage device 6 and controller 8 of FIGS. 1 and 3. However, the techniques may be used with any combination of hardware or software.

Controller 8 may receive a command involving one or more blocks of data (60). Controller 8 may further determine one or more trim blocks associated with the plurality of blocks of data (62). Controller 8 may look up logical addresses of the one or more trim blocks in a pending trim table and determine whether any of the one or more trim blocks are indicated as requiring a trim in the pending trim table (66). In response to no trim blocks from the command indicated as requiring a trim in the pending trim table ("no" branch of 66), controller 8 may execute the command. In response to trim blocks from the command indicated as requiring a trim in the pending trim table ("yes" branch of 66), controller 8 may perform one or more trim operations on the trim blocks (68). Controller 8 may update the pending trim table to indicate that trim blocks do not need a trim (70). In response to trimming all trim block associated with the command, controller 8 may execute the command (72).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

The invention claimed is:

1. A method comprising:
   receiving, by a controller of a storage device, a command including an inherent trim request for a plurality of blocks of data;
   performing, by the controller, a trim operation on a first set of trim blocks associated with the plurality of blocks of data, wherein the first set of trim blocks is associated with fewer than all blocks of the plurality of blocks of data and includes trim blocks on which the controller can complete the trim operation within a predetermined time; and
   updating, by the controller, a pending trim table to include an indication of a second set of trim blocks on which trim is to be performed, wherein blocks from the plurality of blocks of data are associated with the first set of trim blocks or the second set of trim blocks, but not both, and wherein the second set of trim blocks includes blocks of data on which the controller cannot complete the trim operation within the predetermined time.

2. The method of claim 1, wherein the predetermined time is less than a system timeout.

3. The method of claim 1, further comprising receiving, by the controller, an instruction setting the predetermined time.

4. The method of claim 1, further comprising performing, by the controller, a second trim operation on one or more trim blocks indicated by the pending trim table that a trim is to be performed, wherein the second trim operation is performed after the trim operation on the first set of trim blocks.

5. The method of claim 4, wherein the second trim operation is performed at system startup and before the storage device executes media access commands.

6. The method of claim 4, wherein the one or more trim blocks is determined, by the controller, based on priority criteria comprising at least one of a simple sequential range algorithm, a spatial algorithm, or a least recently used algorithm.

7. The method of claim 4, further comprising receiving, by the controller, an instruction setting a size of a trim block.

8. The method of claim 4, further comprising receiving, by the controller, an instruction setting a frequency of the second trim operation.

9. The method of claim 1, further comprising:
   receiving, by the controller, a second command;
   looking up, by the controller, an address requested by the second command in the pending trim table; and
   in response to finding the address in the pending trim table, performing, by the controller, a third trim operation before performing the second command.

10. The method of claim 1, wherein the pending trim table includes a table entry for each of the plurality of blocks of data, and wherein the indication of the second set of trim blocks on which trim is to be performed is a first indicator in the respective table entry.

11. A storage device comprising:
a data storage portion comprising a set of blocks designated to store a plurality of blocks of data; and
a controller configured to:
receive a command including an inherent trim request for the plurality of blocks of data;
perform a trim operation on a first set of trim blocks from the plurality of blocks of data, wherein the first set of trim blocks includes fewer than all blocks of the plurality of blocks of data, and includes trim blocks on which the controller can complete the trim operation within a predetermined time; and
update a pending trim table to include an indication of a second set of trim blocks on which trim is to be performed, wherein blocks from the plurality of blocks of data are part of the first set of trim blocks or the second set of trim blocks, but not both, and wherein the second set of trim blocks includes blocks of data on which the controller cannot complete the trim operation within the predetermined time.

12. The storage device of claim 11, wherein the predetermined time is less than a system timeout.

13. The storage device of claim 11, wherein the controller is further configured to receive an instruction setting the predetermined time.

14. The storage device of claim 11, wherein the controller is further configured to perform a second trim operation on one or more trim blocks indicated by the pending trim table that a trim is to be performed, wherein the second trim operation is performed after the trim operation on the first set of trim blocks.

15. The storage device of claim 14, wherein the one or more trim blocks is determined, by the controller, based on priority criteria comprising at least one of a simple sequential range algorithm, a spatial algorithm, or a least recently used algorithm.

16. The storage device of claim 14, wherein the controller is further configured to receive an instruction setting size of a trim block.

17. The storage device of claim 14, wherein the controller is further configured to receive an instruction setting frequency of the second trim operation.

18. The storage device of claim 11, wherein the controller is further configured to:
receive a second command;
look up an address requested by the second command in the pending trim table; and
in response to finding the address in the pending trim table, perform a third trim operation before performing the second command.

19. The storage device of claim 11, wherein the pending trim table includes a table entry for each trim block, and wherein the indication is a single bit indicating whether the trim block requires a trim.

20. A computer-readable storage device storing instructions that, when executed, cause a processor to:
receive a command including an inherent trim request for a plurality of blocks of data;
perform a trim operation on a first set of trim blocks from the plurality of blocks of data, wherein the first set of trim blocks includes fewer than all blocks of the plurality of blocks of data, and includes trim blocks on which the controller can complete the trim operation within a predetermined time; and
update a pending trim table to include an indication of a second set of trim blocks on which trim is to be performed, wherein blocks from the plurality of blocks of data are part of the first set of trim blocks or the second set of trim blocks, but not both, and wherein the second set of trim blocks includes blocks of data on which the controller cannot complete the trim operation within the predetermined time.

\* \* \* \* \*